US012587721B2

(12) United States Patent
Li

(10) Patent No.: US 12,587,721 B2
(45) Date of Patent: Mar. 24, 2026

(54) VIDEO PROCESSING METHOD, APPARATUS AND SYSTEM

(71) Applicant: Beijing Zitiao Network Technology Co., Ltd., Haidian District (CN)

(72) Inventor: Yang Li, Beijing (CN)

( * ) Notice: Subject to any disclaimer, the term of this patent is extended or adjusted under 35 U.S.C. 154(b) by 156 days.

(21) Appl. No.: 18/570,906

(22) PCT Filed: Aug. 31, 2022

(86) PCT No.: PCT/CN2022/116287
§ 371 (c)(1),
(2) Date: Dec. 15, 2023

(87) PCT Pub. No.: WO2023/030402
PCT Pub. Date: Mar. 9, 2023

(65) Prior Publication Data
US 2024/0298080 A1     Sep. 5, 2024

(30) Foreign Application Priority Data

Aug. 31, 2021   (CN) .......................... 202111012150.0

(51) Int. Cl.
*H04N 21/44*          (2011.01)
*H04N 21/83*          (2011.01)
(Continued)

(52) U.S. Cl.
CPC ........... *H04N 21/845* (2013.01); *H04N 21/44* (2013.01)

(58) Field of Classification Search
CPC ...... H04N 21/44; H04N 21/845; H04N 21/83; H04N 7/00; H04N 7/01; H04N 7/015;
(Continued)

(56) References Cited

U.S. PATENT DOCUMENTS

2008/0115176 A1     5/2008  Rodriguez
2013/0089142 A1     4/2013  Begen et al.
(Continued)

FOREIGN PATENT DOCUMENTS

CN        101277450 A     10/2008
CN        101317455 A     12/2008
(Continued)

OTHER PUBLICATIONS

China National Intellectual Property Administration, First Office Action for Chinese Application No. 202111012150.0, mailed on Jan. 23, 2025, 11 pages.
(Continued)

*Primary Examiner* — Daquan Zhao
(74) *Attorney, Agent, or Firm* — Alleman Hall LLP

(57)                 ABSTRACT

Embodiments of the present disclosure provide a video processing method, apparatus and system, an electronic device, a storage medium, a computer program product, and a computer program. The method comprises: acquiring multimedia information, the multimedia information comprising multiple segments of multimedia material, and decoding the multiple segments of multimedia material on the basis of different decoders to obtain video frames of the segments of multimedia material, wherein one decoder decodes non-adjacent segments of multimedia material, and one segment of multimedia material corresponds to at least one video frame; and in response to two adjacent video frames received by a renderer being decoded by different decoders, generating a key frame on the basis of the renderer, outputting the key frame to an encoder, and on the basis of an encoding operation of the encoder according to the key frame, generating a video of the multimedia information.

15 Claims, 3 Drawing Sheets

(51) Int. Cl.
| | |
|---|---|
| *H04N 21/845* | (2011.01) |
| *H04N 7/00* | (2011.01) |
| *H04N 7/01* | (2006.01) |

(58) Field of Classification Search
CPC .. H04N 7/08; H04N 7/06; H04N 7/04; H04N 7/025

USPC .......................... 386/353, 354, 355, 356, 326
See application file for complete search history.

(56) References Cited

U.S. PATENT DOCUMENTS

| | | | |
|---|---|---|---|
| 2013/0329781 | A1 | 12/2013 | Su et al. |
| 2013/0329798 | A1* | 12/2013 | Wu ...................... H04N 19/105 |
| | | | 375/E7.125 |
| 2015/0350717 | A1 | 12/2015 | Pantos et al. |
| 2016/0227222 | A1 | 8/2016 | Hu et al. |
| 2017/0064313 | A1* | 3/2017 | Wu ......................... H04N 19/70 |
| 2018/0240502 | A1 | 8/2018 | Katsavounidis |

FOREIGN PATENT DOCUMENTS

| | | | |
|---|---|---|---|
| CN | 103891281 | A | 6/2014 |
| CN | 105144727 | A | 12/2015 |
| CN | 106791850 | A | 5/2017 |
| CN | 109788212 | A | 5/2019 |
| CN | 112672163 | A | 4/2021 |
| EP | 2571278 | A1 | 3/2013 |
| IN | 202028043701 | A | 11/2020 |

OTHER PUBLICATIONS

ISA China National Intellectual Property Administration, International Search Report Issued in Application No. PCT/CN2022/116287, Nov. 23, 2022, 11 pages.

* cited by examiner

600

VIDEO PROCESSING METHOD, APPARATUS AND SYSTEM

CROSS REFERENCE TO RELATED APPLICATIONS

The present application is a U.S. National Stage Application of PCT Application Serial No. PCT/CN2022/116287, filed Aug. 31, 2022, which claims a priority right to the Chinese patent application No. 202111012150.0 entitled "Video Processing Method, Apparatus and System" filed with the Chinese Patent Office on Aug. 31, 2021, the entire disclosure of which is hereby incorporated by reference in their entireties.

FIELD

Embodiments of the present disclosure relate to the field of video processing technologies, and particularly to a video processing method, an apparatus, a system, an electronic device, a storage medium, a computer program product, and a computer program.

BACKGROUND

A video may be obtained by splicing multiple segments of a multimedia material based on a transition process.

Currently, in the process of transition processing splicing, a conventional encoding manner is employed, for example, a fixed Instantaneous Decoding Refresh (IDR) frame is set for an encoder, so that the encoder encodes a plurality of subsequent frames to be encoded based on the IDR frame.

However, at a splicing position of adjacent frames, an IDR frame is a frame corresponding to a previous segment of multimedia material, and a frame to be encoded is a frame corresponding to a subsequent segment of multimedia material; since there is a too large difference between the previous segment of multimedia material and the subsequent segment of multimedia material, a technical problem that the image quality lags in a video generated by encoding might be caused.

SUMMARY

Embodiments of the present disclosure provide a video processing method, an apparatus, a system, an electronic device, a storage medium, a computer program product, and a computer program, to overcome the technical problem of image quality lag in a video.

In a first aspect, embodiments of the present disclosure provide a video processing method, comprising;

acquiring multimedia information, the multimedia information comprising multiple segments of multimedia material, and decoding the multiple segments of multimedia material based on different decoders to obtain video frames of respective segments of multimedia material, wherein a decoder decodes non-adjacent segments of multimedia material, and one segment of multimedia material corresponds to at least one video frame;

in response to two adjacent video frames received by a renderer being decoded by different decoders, generating a key frame based on the renderer, outputting the key frame to an encoder, and generating a video of the multimedia information based on encoding operations of the encoder according to the key frame.

In a second aspect, embodiments of the present disclosure provide a video processing apparatus, comprising:

an acquisition unit for acquiring multimedia information, the multimedia information comprising multiple segments of multimedia material;

a decoding unit for decoding the multiple segments of multimedia material based on different decoders to obtain video frames of the respective segments of multimedia material, wherein a decoder decodes non-adjacent segments of multimedia material, and one segment of multimedia material corresponds to at least one video frame;

an outputting unit for, in response to two adjacent video frames received by a renderer being decoded by different decoders, generating a key frame based on the renderer, outputting the key frame to an encoder;

an encoding unit for generating a video of the multimedia information based on encoding operations of the encoder according to the key frame.

In a third aspect, embodiments of the present disclosure provide an electronic device comprising: at least one processor and a memory;

the memory stores computer-executable instructions;

the at least one processor executes the computer-executable instructions stored in the memory to cause the at least one processor to perform the video processing method according to the above first aspect and various possibilities of the first aspect.

In a fourth aspect, embodiments of the present disclosure provide a computer-readable storage medium having stored therein computer-executable instructions which, when executed by a processor, implement the video processing method according to the above first aspect and various possibilities of the first aspect.

In a fifth aspect, there is provided a computer program product comprising: a computer program, the computer program being stored in a readable storage medium, the computer program being readable by at least one processor of the electronic device from the readable storage medium, the at least one processor executing the computer program to cause the electronic device to perform the video processing method according to the above first aspect and various possibilities of the first aspect.

In a sixth aspect, there is provided a video processing system, comprising: a plurality of decoders, a renderer connected with each decoder, and an encoder connected with the renderer, wherein the each decoder is used for decoding non-adjacent segments of multimedia material in multimedia information comprising multiple segments of multimedia material to obtain video frames, wherein one segment of multimedia material corresponds to at least one video frame;

the renderer is used for generating and outputting a key frame to the encoder in response to two adjacent video frames received by the renderer being decoded by different decoders;

the encoder is used for generating a video of the multimedia information according to encoding operations of the key frame.

In a seventh aspect, there is provided a computer program which, when executed by a processor, performs the video processing method according to the above first aspect and various possibilities of the first aspect.

Embodiments provide the video processing method, apparatus and system. The video processing method comprises: acquiring multimedia information, the multimedia information comprising multiple segments of multimedia material, and decoding the multiple segments of multimedia material based on different decoders to obtain video frames of the respective segments of multimedia material, wherein a decoder decodes non-adjacent segments of multimedia material, and one segment of multimedia material corresponds to at least one video frame; in response to two adjacent video frames received by a renderer being decoded by different decoders, generating a key frame based on the renderer, outputting the key frame to an encoder, and generating a video of the multimedia information based on encoding operations of the encoder according to the key frame. In the present embodiment, the following technical features are introduced: different multimedia material are decoded by different decoders to obtain video frames respectively corresponding to the multimedia material; when two adjacent video frames are decoded by different decoders, the renderer generates and outputs the key frame to the encoder, so that the encoder performs an encoding operation according to the key frame to obtain technical features of a video. That is to say, the difference between two adjacent video frames is fully taken into account when performing the transition processing and splicing, thereby avoiding a drawback that the image quality lags in the video caused by using an IDR frame of a preceding video frame in the two adjacent video frames to perform the encoding operation on the following video frame, and improving the image quality of the video and satisfying the user's viewing experience.

BRIEF DESCRIPTION OF THE DRAWINGS

Figures to be used in the depictions of embodiments or prior art will be introduced briefly in order to illustrate technical solutions of embodiments of the present disclosure or the prior art more clearly. It is obvious that the figures in the following depictions are merely some embodiments described in the present description, and those skilled in the art can further obtain other figures according to these figures without making any inventive efforts.

DETAILED DESCRIPTION OF EMBODIMENTS

To make the objectives, technical solutions and advantages of embodiments of the present disclosure more apparent, the technical solutions in embodiments in the disclosure will be described below clearly and completely with reference to figures in the embodiments of the disclosure. Obviously, the described embodiments are only partial embodiments in the disclosure rather than all embodiments. All other embodiments obtained by those skilled in the art without making inventive efforts based on the embodiments in the disclosure should fall within the scope of protection of the present disclosure.

A video is composed of multiple segments of multimedia material. A video with relatively high image quality may be obtained through performing transition processing and splicing of the multiple segments of multimedia material.

The transition processing and splicing of the multiple segments of multimedia material refers to using certain skills, such as wiping, overlapping and rolling pages, between any two adjacent segments of multimedia material to achieve a smooth transition between scenes or plots, or to achieve an effect of enriching pictures to attract audience.

Figure 1:
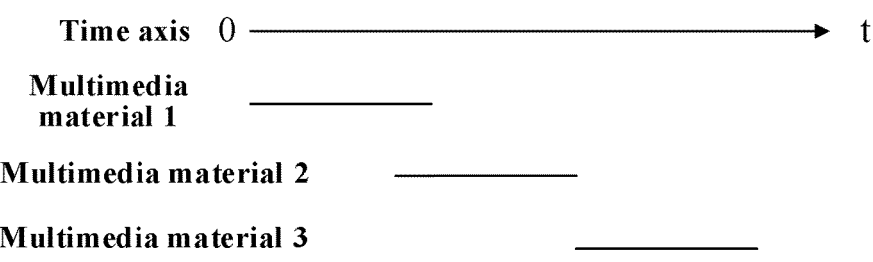
FIG. 1 is a schematic diagram of an application scene of a video processing method according to an embodiment of the present disclosure.

As shown in FIG. 1, on a time axis of (0, t), there are three segments of multimedia material, which are multimedia material 1, multimedia material 2 and multimedia material 3, respectively, as shown in FIG. 1.

In the relevant art, a fixed IDR frame is usually employed and set, the transition processing and splicing of the multimedia material 1 and the multimedia material 2 as shown in FIG. 1 is performed based on the fixed IDR frame, and the transition processing and splicing of the multimedia material 2 and the multimedia material 3 as shown in FIG. 1 is performed based on the IDR frame to obtain a video composed of the multimedia material 1, the multimedia material 2 and the multimedia material 3.

However, at the position of transition processing and splicing of adjacent frames, for example, at the position of the transition processing and splicing of the multimedia material 1 and the multimedia material 2 (namely, at the transition from the multimedia material 1 to the multimedia material 2), since the IDR frame is fixed, the IDR frame used for processing the multimedia material 2 is the same as the IDR frame used for processing the multimedia material 1; since the multimedia material 1 and the multimedia material 2 are two different segments of multimedia material, when the multimedia material 2 is encoded with the IDR frame corresponding to the multimedia material 1, there is a technical problem that the transition picture from the multimedia material 1 to the multimedia material 2 in the video generated by the encoding is blurred and the image quality lags in the video.

In order to avoid the above technical problems, the inventors of the present disclosure have obtained the following inventive concept of the present disclosure by making inventive efforts: a decoder parses a segment of multimedia material to obtain a corresponding video frame; when two adjacent video frames are received by a renderer, a key frame is generated and output to the encoder; and the encoder performs an encoding operation according to a key frame to obtain a video.

The technical solutions of the present disclosure and how the technical solutions of the present disclosure solve the above-mentioned technical problems are described in detail below in terms of specific embodiments. The following specific embodiments may be combined with each another, and the same or similar concepts or processes may not be repeated in some embodiments. Embodiments of the present disclosure will now be described with reference to the accompanying drawings.

Figure 2:
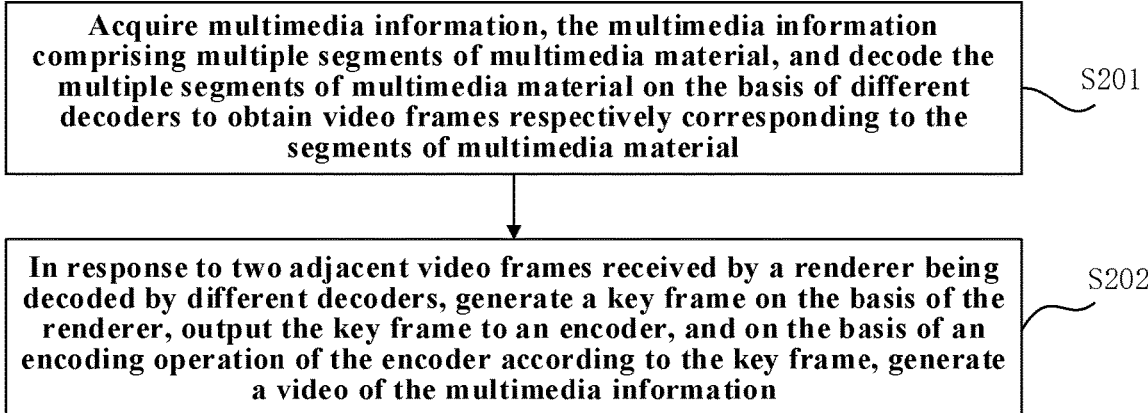
FIG. 2 is a schematic diagram of a video processing method according to an embodiment of the present disclosure.

Referring to FIG. 2, FIG. 2 shows a video processing method according to an embodiment of the present disclosure.

As shown in FIG. 2, the method comprises:

S201: acquiring multimedia information, the multimedia information comprising multiple segments of multimedia material, and decoding the multiple segments of multimedia material on the basis of different decoders to obtain video frames respectively corresponding to the segments of multimedia material.

wherein a decoder decodes non-adjacent segments of multimedia material, and one segment of multimedia material corresponds to at least one video frame.

The multimedia material may be a video material, an image material, a moving image material, or a mixture of different types of multimedia material, and is not limited by the present embodiment.

By way of example, a subject for implementing the present embodiment may be a video processing apparatus (hereinafter referred to as a processing apparatus), and the processing apparatus may be a computer, a server, a terminal device, a processor, a chip, etc. and is not limited in the present embodiment.

The present embodiment does not limit the number of multimedia material decoded by any decoder. For example, in some embodiments, one decoder may decode multiple segments of multimedia material, and any two segments of multimedia material processed consecutively are non-adjacent multimedia material in the multimedia information. In other embodiments, a decoder may decode only one segment of multimedia material.

S202: in response to two adjacent video frames received by a renderer being decoded by different decoders, generating a key frame on the basis of the renderer, outputting the key frame to an encoder, and on the basis of an encoding operation of the encoder according to the key frame, generating a video of the multimedia information.

Figure 3:
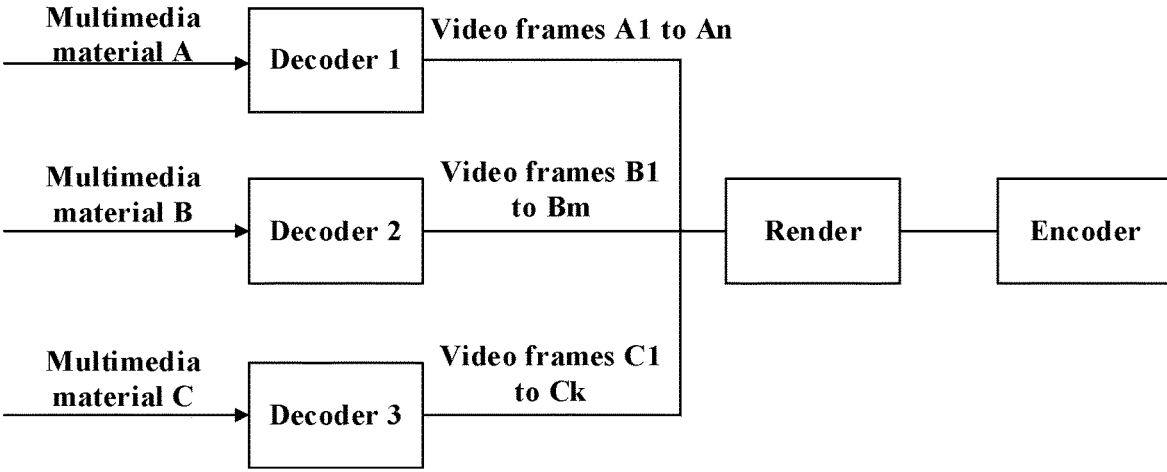
FIG. 3 is a schematic diagram showing principles of a video processing method according to an embodiment of the present disclosure.

For example, as shown in FIG. 3, there are two segments of multimedia material, one segment being multimedia material A and the other segment being multimedia material B; a decoder 1 is used for decoding the multimedia material A to obtain video frames A1 to An (n is a positive integer greater than 1) and transmitting the video frames A1 to An to a renderer; a decoder 2 is used for decoding the multimedia material B to obtain video frames B1 to Bm (m is a positive integer greater than 1, and the magnitude between n and m is not limited) and transmitting the video frames B1 to Bm to the renderer.

The renderer receives the video frames A1 to An, and receives the video frames B1 to Bm. The video frame An and the video frame Bm are two adjacent video frames, and then the renderer may determine that the video frame An and the video frame B1 are generated by different decoders, and output the key frame to the encoder.

Correspondingly, the encoder performs an encoding operation based on the key frame, for example, the renderer outputs the video frame B1 as the key frame to the encoder, and the encoder performs encoding processing on the video frames B2 to Bm according to the video frame B1 to obtain and output a video.

It should be noted that since the key frame used for encoding the video frames B2 to Bm is the video frame B1, it avoids erroneously referring to a previous key frame upon encoding the video frames B2 to Bm based on a certain video frame in the video frames A1 to An, thereby avoiding the problem of blurred mosaic of the video, thereby improving the image quality of the video and satisfying the user's viewing experience.

The present embodiment does not limit the encoding operation, for example, a dynamic encoding operation, namely, Variable Bit Rate (VBR), may be used, a static encoding operation, namely, Constants Bit Rate (CBR) may be used, and an average bit rate encoding operation, namely, Average Bit Rate (ABR), may be used.

As known from the above analysis, a video processing method according to the embodiment of the present disclosure comprises: acquiring multimedia information, the multimedia information comprising multiple segments of multimedia material, and decoding the multiple segments of multimedia material based on different decoders to obtain video frames corresponding to respective segments of multimedia material, wherein a decoder decodes non-adjacent segments of multimedia material, and one segment of multimedia material corresponds to at least one video frame; in response to two adjacent video frames received by a renderer being decoded by different decoders, generating a key frame based on the renderer, outputting the key frame to an encoder, and generating a video of the multimedia information based on encoding operations of the encoder according to the key frame. In the present embodiment, the following technical features are introduced: different multimedia material are decoded by different decoders to obtain video frames respectively corresponding to the multimedia material; when two adjacent video frames are decoded by different decoders, the renderer generates and outputs the key frame to the encoder, so that the encoder performs an encoding operation according to the key frame to obtain the technical features of a video. That is to say, the difference between two adjacent video frames is fully taken into account when performing the transition processing and splicing, thereby avoiding a drawback that the image quality lags in the video caused by using an IDR frame of a preceding video frame in the two adjacent video frames to perform the encoding operation on the following video frame, and improving the image quality of the video and satisfying the user's viewing experience.

Figure 4:
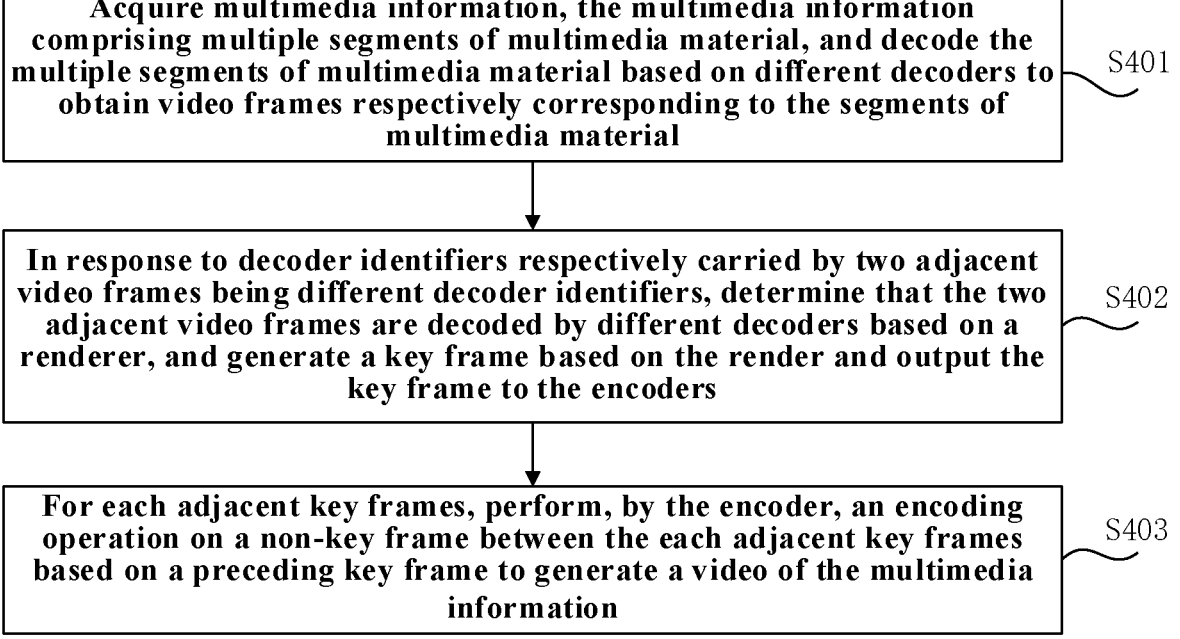
FIG. 4 is a schematic diagram of a video processing method according to another embodiment of the present disclosure.

Referring to FIG. 4, it illustrates a video processing method according to another embodiment of the present disclosure.

As shown in FIG. 4, the method comprises:

S401: acquiring multimedia information, the multimedia information comprising multiple segments of multimedia material, and decoding the multiple segments of multimedia material based on different decoders to obtain video frames respectively corresponding to the segments of multimedia material.

A decoder decodes non-adjacent multimedia material, a segment of multimedia material corresponds to at least one video frame, each decoder has a decoder identifier, and each video frame carries a decoder identifier for obtaining each video frame by decoding.

In the present embodiment, in order to distinguish different decoders, each decoder may be assigned an identifier (i.e., the decoder identifier); for any decoder, after the multimedia material is decoded by the decoder, the decoder identifier is added to each video frame obtained by decoding.

For example, the processing apparatus may assign decoder identifiers to the decoders such that different decoders have different decoder identifiers, and the decoder for decoding each segment of multimedia material is determined.

It should be appreciated that in some embodiments, the multimedia material and the decoders may be in a one-to-one relationship, for example, a segment of multimedia material corresponds to a decoder, and a decoder decodes corresponding to a segment of multimedia material.

For example, the segments of multimedia material comprise multimedia material 1 up to multimedia material x (x is a positive integer greater than or equal to 2), the number of decoders is also x, and one decoder decodes non-adjacent multimedia material.

In other embodiments, the number of decoders may be less than the number of multimedia material, and the two segments of multimedia videos successively decoded by any one decoder are two non-adjacent segments of multimedia material in the multimedia information.

For example, the segments of multimedia material comprise multimedia material 1 until multimedia material x, wherein x is a positive integer greater than or equal to 2; the number of decoders is y, y is a positive integer less than x; regarding the multimedia material being two adjacent segments of multimedia material in the multimedia information, such as multimedia material x–1 and multimedia material x, if the decoder y is used for decoding the multimedia material x, it is not used for decoding the multimedia material x–1; on the contrary, if the decoder y is used for decoding the multimedia material x–1, it is not used for decoding the multimedia material x.

S402: In response to decoder identifiers respectively carried by two adjacent video frames being different decoder identifiers, determining that the two adjacent video frames are decoded by different decoders based on a renderer, and generating a key frame based on the render and outputting the key frame to the encoders.

For example, in conjunction with FIG. 3 and the above embodiment corresponding to FIG. 3, a decoder identifier of a decoder 1 is carried in video frames A1 to An and a decoder identifier of a decoder 2 is carried in video frames B1 to Bm, and for each video frame in the received video frames A1 to An and video frames B1 to Bm, the renders judges whether the decoder identifier carried in the current video frame is the same as the decoder identifier carried in the preceding video frame, so as to generate and output the key frame to the encoder.

Exemplarily, if the current video frame is a video frame An and the previous video frame is a video frame An–1, the renderer determines that the decoder identifier carried in the video frame An is the decoder identifier of the decoder 1, and determines that the decoder identifier carried in the video frame An–1 is also the decoder identifier of the decoder 1, then the renderer determines that the decoder identifier carried in the video frame An is the same as the decoder identifier carried in the video frame An–1, and there is no need to output the key frame to the encoder.

Conversely, if the previous video frame is the video frame An and the current video frame is the video frame B1, the renderer determines that the decoder identifier carried in the video frame An is the decoder identifier of the decoder 1, and determines that the decoder identifier carried in the video frame B1 is the decoder identifier of the decoder 2, then the renderer determines that the decoder identifier carried in the video frame An is different from the decoder identifier carried in the video frame B1, and then generates and outputs the key frame to the encoder.

In the present embodiment, the convenience and reliability of the determination may be achieved by determining whether two adjacent video frames are generated by the same decoder or by different decoders in combination with decoder identifiers.

In some embodiments, the key frame is an instantaneous decoding refresh IDR frame.

S403: for each adjacent key frames, performing, by the encoder, an encoding operation on a non-key frame between each adjacent key frames based on a preceding key frame to generate a video of the multimedia information.

For example, with reference to FIG. 3 and the above embodiment corresponding to FIG. 3, if the renderer determines and outputs the key frame B1 to the encoder according to the video frame An and the video frame B1, and likewise, the decoder 3 decodes the multimedia material C to generate video frames C1 to video frames Ck (k is a positive integer greater than 1, and the magnitudes of n, m and k are not limited), the renderer may determine and output the key frame C1 to the encoder according to the video frame Bm and the video frame C1.

Correspondingly, the encoder performs encoding operations on the video frames between the key frame B1 and the key frame C1 according to the key frame B1, namely, performs encoding operations on the video frames B2 up to Bm (wherein the video frames B2 up to Bm are non-key frames) according to the key frame B1.

In the present embodiment, the encoding operations are performed using different key frames for video frames corresponding to different segments of multimedia material, thereby avoiding the defect of image quality lag, achieving the technical effect of improving image quality and satisfying the user's viewing experience.

In some embodiments, the processing apparatus may set a video code rate for the encoder, and the video code rate may be understood to be the number of bits of data transmitted per unit time during data transmission, with a measure unit being kilobits per second, or the video code rate may be simply understood to be the amount of data output by the encoder, and correspondingly, the encoding operations executed by the encoder may be achieved in conjunction with the video code rate to improve the picture quality of the video.

For example, the processing apparatus determines the video code rate according to preset video demand information, and the encoder performs an encoding operation on a non-key frame between each adjacent key frames based on the previous key frame and the video code rate to generate a video of the multimedia information. The video demand information may be video resolution information.

Figure 5:
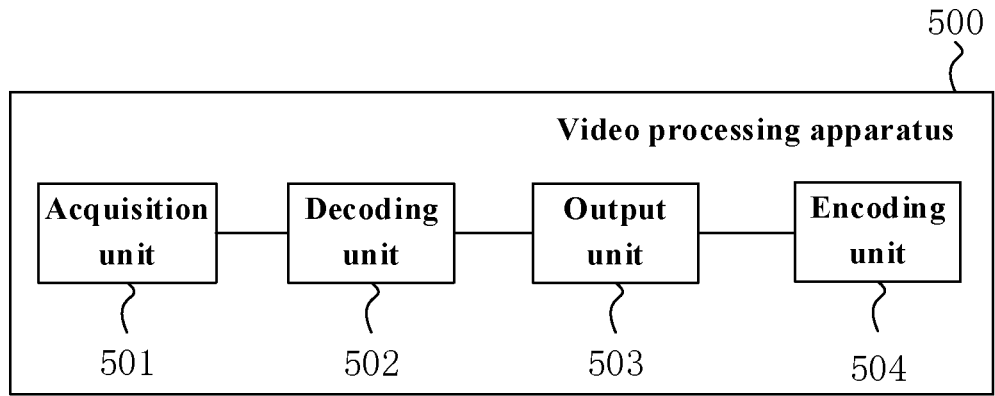
FIG. 5 is a schematic diagram of a video processing apparatus according to an embodiment of the present disclosure.

Referring to FIG. 5, it illustrates a schematic diagram of a video processing apparatus according to one embodiment of the present disclosure.

As shown in FIG. 5, a video processing apparatus 500 comprises:

an acquisition unit 501 for acquiring multimedia information, the multimedia information comprising multiple segments of multimedia material;

a decoding unit 502 for decoding the multiple segments of multimedia material based on different decoders to obtain video frames respectively corresponding to the segments of multimedia material, wherein a decoder decodes non-adjacent segments of multimedia material, and one segment of multimedia material corresponds to at least one video frame;

an outputting unit 503 for, in response to two adjacent video frames received by a renderer being decoded by different decoders, generating a key frame based on the renderer, outputting the key frame to an encoder;

an encoding unit 504 for generating a video of the multimedia information based on encoding operations of the encoder according to the key frame.

Figure 6:
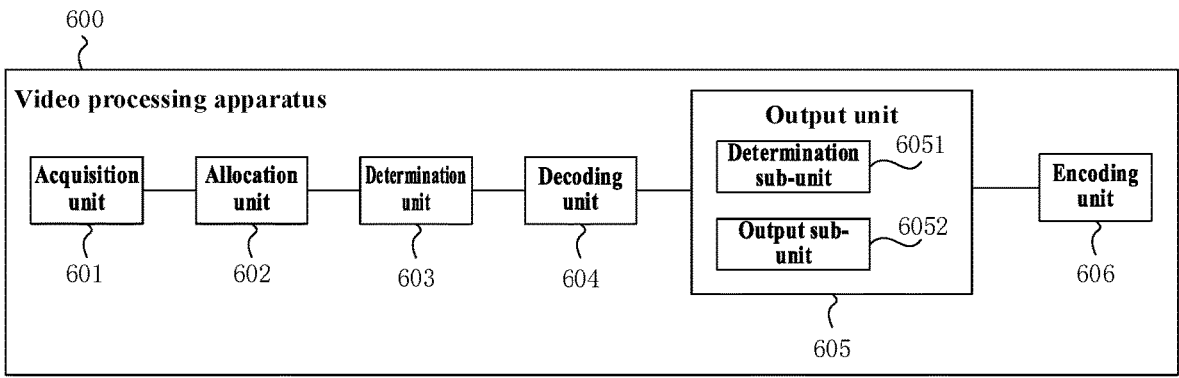
FIG. 6 is a schematic diagram of a video processing apparatus according to another embodiment of the present disclosure.

Referring to FIG. 6, it illustrates a schematic diagram of a video processing apparatus according to another embodiment of the present disclosure.

As shown in FIG. 6, a video processing apparatus 600 comprises:

an acquisition unit 601 for acquiring multimedia information, the multimedia information comprising multiple segments of multimedia material;

an allocation unit 602 for allocating a decoder identifier to each decoder;

a determination unit 603 for determining a decoder for decoding each segment of multimedia material;

a decoding unit 604 for decoding the multiple segments of multimedia material based on different decoders to obtain video frames of the respective segments of multimedia material, wherein a decoder decodes non-adjacent segments of multimedia material, and one segment of multimedia material corresponds to at least one video frame;

an outputting unit 605 for, in response to two adjacent video frames received by a renderer being decoded by different decoders, generating a key frame based on the renderer, outputting the key frame to an encoder;

In some embodiments, each decoder has a decoder identifier, and each video frame carries a decoder identifier of each video frame obtained by decoding. With reference to FIG. 6, the output unit 605 comprises:

a determination sub-unit 6051 for determining that the two adjacent video frames are generated by different decoders by decoding, if the decoder identifiers respectively carried by the two adjacent video frames are different decoder identifiers.

an output sub-unit 6052 for generating a key frame based on the renderer and outputting the key frame to the encoder.

In some embodiments, the key frame is an instantaneous decoding refresh IDR frame.

An encoding unit 606 for generating a video of the multimedia information based on encoding operations of the encoder according to the key frame.

In some embodiments, the encoding unit 606 is configured to, for each adjacent key frames, perform an encoding operation on a non-key frame between each adjacent key frames based on a preceding key frame to generate a video of the multimedia information.

In some embodiments, the encoding unit 606 is used for generating the video of the multimedia information based on the encoding operations of the encoder according to the key frames and a preset video code rate, wherein the video code rate is determined based on preset video demand information.

According to an embodiment of the present application, the present application further provides an electronic device and a readable storage medium.

According to an embodiment of the present application, the present application further provides a computer program product comprising: a computer program, the computer program being stored in a readable storage medium, the computer program being readable by at least one processor of the electronic device from the readable storage medium, the at least one processor executing the computer program to cause the electronic device to perform the solution provided by any of the above embodiments.

Figure 7:
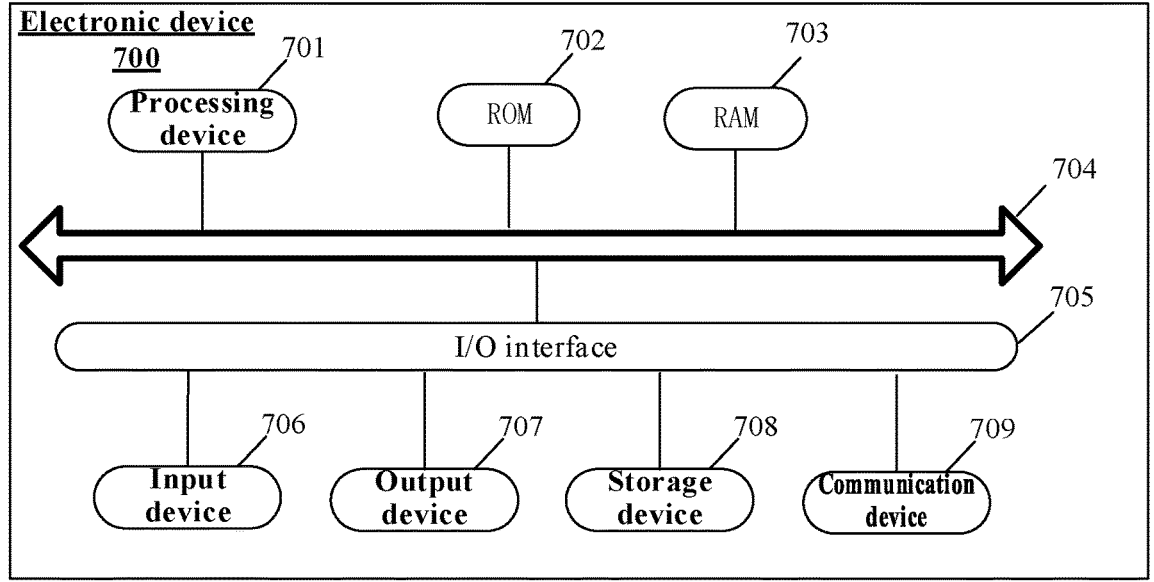
FIG. 7 is a block diagram of hardware of an electronic device according to an embodiment of the present disclosure.

Referring to FIG. 7, it illustrates a schematic structural diagram of an electronic device 700 according to an embodiment of the present disclosure. The electronic device 700 may be a terminal device or a server. The terminal device may comprise, but not limited to, mobile terminals such as mobile phones, notebook computers, digital broadcast receivers, PDAs (Personal Digital Assistants), PADs (Tablet Computers), PMPs (Portable Multimedia Players), in-vehicle terminals (e.g., in-vehicle navigation terminals), etc. and fixed terminals such as digital TVs, desktop computers, etc. The electronic device shown in FIG. 7 is merely an example and should not impose any limitations on the functionality and scope of use of embodiments of the present disclosure.

As shown in FIG. 7, the electronic device 700 may comprise a processing device (e.g., a central processing unit, a graph processor, etc.) 701 that may perform various suitable actions and processes in accordance with a program stored in a read only memory (ROM) 702 or a program loaded from a storage device 708 into a random access memory (RAM) 703. In the RAM 703, various programs and data needed by the operation of the electronic device 700 are also stored. The processing device 701, the ROM 702, and the RAM 703 are connected to each other via a bus 704. An input/output (I/O) interface 705 is also coupled to bus 704.

In general, the following devices may be connected to the I/O interface 705: an input device 706 including, for example, a touch screen, a touch pad, a keyboard, a mouse, a camera, a microphone, an accelerometer, a gyroscope, etc.; an output device 707 including, for example, a liquid crystal display (LCD), a speaker, a vibrator, etc.; a storage device 708 including, for example, a magnetic tape, a hard disk, etc.; and a communication device 709. The communication device 709 may allow the electronic device 700 to communicate in a wireless or wired manner with other devices to exchange data. While FIG. 7 illustrates the electronic device 700 having various devices, it is to be understood that not all illustrated devices are required to be implemented or provided. More or fewer devices may alternatively be implemented or provided.

In particular, the processes described above with reference to flow charts may be implemented as computer software programs in accordance with embodiments of the present disclosure. For example, embodiments of the present disclosure comprise a computer program product comprising a computer program carried on a computer-readable medium, the computer program comprising program code for performing the method illustrated by the flow charts. In such embodiments, the computer program may be downloaded and installed from a network via the communication device 709, or installed from the storage device 708, or installed from the ROM 702. When the computer program is executed by the processing device 701, the above-described functions defined in the method of the embodiments of the present disclosure are performed.

It is appreciated that the computer-readable medium described above in the present disclosure may be either a computer-readable signal medium or a computer-readable storage medium, or any combination of the two. The computer-readable storage medium may be, for example but not limited to, an electronic, magnetic, optical, electromagnetic, infrared, or semiconductor system, apparatus, or device, or a combination of any of the above. More specific examples of the computer-readable storage medium may comprise, but are not limited to: an electrical connection having one or more wires, a portable computer magnetic disk, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination of the above. In the present disclosure, the computer-readable storage medium may be any tangible medium that contains or stores a program that may be used by or in conjunction with an instruction execution system, apparatus, or device. In the present disclosure, the computer-readable signal medium may comprise a data signal embodied in baseband or propagated as part of a carrier carrying computer-readable program code. Such propagated data signals may take many forms, including but not limited to, electromagnetic signals, optical signals, or any suitable combinations thereof. The computer-readable signal medium may also be any computer-readable medium other than a computer-readable storage medium that may send, propagate, or transport the program for use by or for use in conjunction with the instruction execution system, apparatus, or device. The program code contained on the computer-readable medium may be transmitted with any suitable medium including, but not limited to: electrical wire, optic cable, RF (radio frequency), and the like, or any suitable combinations thereof.

The computer readable medium may be contained in the above-described electronic device; it may also be present separately and not installed into the electronic device.

The computer-readable medium carries one or more programs that, when executed by the electronic device, cause the electronic device to perform the method shown in the above embodiments.

The computer program code for carrying out operations of the present disclosure may be written in one or more programming languages or combinations thereof. The programming languages include, but not limited to, object-oriented programming languages, such as Java, smalltalk, C++, and conventional procedural programming languages, such as the "C" language or similar programming languages. The program code may be executed entirely on the user's computer, executed partly on the user's computer, executed as a stand-alone software package, executed partly on the user's computer and partly on a remote computer, or executed entirely on the remote computer or a server. In the case of the remote computer, the remote computer may be connected to the user's computer through any type of network, including a local area network (LAN) or a wide area network (WAN), or it may be connected to an external computer (e.g., through the Internet using an Internet Service Provider).

According to another aspect of an embodiment of the present disclosure, the embodiment of the present disclosure further provides a video processing system, comprising: a plurality of decoders, a renderer connected with each decoder, and an encoder connected with the renderer, wherein
    the each decoder is used for decoding non-adjacent segments of multimedia material in multimedia information comprising multiple segments of multimedia material to obtain video frames, wherein one segment of multimedia material corresponds to at least one video frame;
    the renderer is used for generating and outputting a key frame to the encoder in response to two adjacent video frames received by the renderer being generated by different decoders by decoding;
    the encoder is used for generating a video of the multimedia information according to encoding operations of the key frame.

For example, with reference to FIG. 3, the number of decoders may be plural, and it should be understood that FIG. 3 is for exemplary purposes only and that the number of decoders possible in the present embodiment is not to be construed as limiting the number of decoders.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special-purpose hardware and computer instructions.

The units described in connection with the embodiments disclosed herein may be implemented in a software or hardware manner. The names of the units do not constitute limitations of the units themselves in a certain case. For example, the first acquisition unit may also be described as "a unit for acquiring at least two international protocol addresses".

The functions described herein above may be performed, at least in part, by one or more hardware logic components. For example, without limitation, exemplary types of hardware logic components that may be used comprise: a Field Programmable Gate Array (FPGA), an Application Specific Integrated Circuits (ASIC), an Application Specific Standard Products (ASSP), a Systems On Chip (SOC), a Complex Programmable Logic Device (CPLD), and so on.

In the context of the present disclosure, the machine-readable medium may be a tangible medium that may contain or store a program for use by or for use in conjunction with an instruction execution system, apparatus, or device. The machine-readable medium may be a machine-readable signal medium or a machine-readable storage medium. The machine-readable medium may comprise, but is not limited to, an electronic, magnetic, optical, electromagnetic, infrared, or semiconductor system, apparatus, or device, or any suitable combinations thereof. More specific examples of the machine-readable storage medium would comprise an electrical connection based on one or more wires, a portable computer diskette, a hard disk, a random access memory (RAM), a read-only memory (ROM), an erasable programmable read-only memory (EPROM or Flash memory), an optical fiber, a compact disc read-only memory (CD-ROM), an optical storage device, a magnetic storage device, or any suitable combination thereof.

In a first aspect, according to one or more embodiments of the present disclosure, there is provided a video processing method, comprising:
    acquiring multimedia information, the multimedia information comprising multiple segments of multimedia material, and decoding the multiple segments of multimedia material based on different decoders to obtain video frames of the respective segments of multimedia material, wherein a decoder decodes non-adjacent segments of multimedia material, and one segment of multimedia material corresponds to at least one video frame;

in response to two adjacent video frames received by a renderer being decoded by different decoders, generating a key frame based on the renderer, outputting the key frame to an encoder, and generating a video of the multimedia information based on encoding operations of the encoder according to the key frame.

According to one or more embodiments of the present disclosure, each decoder has a decoder identifier, and each video frame carries a decoder identifier of each video frame obtained by decoding; and wherein in response to two adjacent video frames received by a renderer being generated by different decoders by decoding, generating the key frame based on the renderer, outputting the key frame to an encoder, comprises:

in response to the decoder identifiers respectively carried by the two adjacent video frames being different decoder identifiers, determining that the two adjacent video frames are decoded by different decoders, and generating a key frame based on the render and outputting the key frame to the encoder.

According to one or more embodiments of the present disclosure, the video processing method further comprises:

allocating a decoder identifier to each decoder, and determining a decoder for decoding each segment of multimedia material.

According to one or more embodiments of the present disclosure, the key frame is an instantaneous decoding refresh IDR frame.

According to one or more embodiments of the present disclosure, the generating a video of the multimedia information based on encoding operations of the encoder according to the key frame comprises:

for each adjacent key frames, performing an encoding operation on a non-key frame between each adjacent key frames based on a preceding key frame to generate a video of the multimedia information.

According to one or more embodiments of the present disclosure, the generating a video of the multimedia information based on encoding operations of the encoder according to the key frame comprises:

generating the video of the multimedia information based on the encoding operations of the encoder according to the key frame and a preset video code rate, wherein the video code rate is determined based on preset video demand information.

In a second aspect, according to one or more embodiments of the present disclosure, there is provided a video processing apparatus, comprising:

an acquisition unit for acquiring multimedia information, the multimedia information comprising multiple segments of multimedia material;

a decoding unit for decoding the multiple segments of multimedia material based on different decoders to obtain video frames of the respective segments of multimedia material, wherein a decoder decodes non-adjacent segments of multimedia material, and one segment of multimedia material corresponds to at least one video frame;

an outputting unit for, in response to two adjacent video frames received by a renderer being generated by different decoders by decoding, generating a key frame based on the renderer, outputting the key frame to an encoder;

an encoding unit for generating a video of the multimedia information based on encoding operations of the encoder according to the key frame.

According to one or more embodiments of the present disclosure, each decoder has a decoder identifier, and each video frame carries a decoder identifier of each video frame obtained by decoding; the output unit comprises:

a determination sub-unit for determining that the two adjacent video frames are generated by different decoders by decoding, if the decoder identifiers respectively carried by the two adjacent video frames are different decoder identifiers;

an output sub-unit for generating a key frame based on the render and outputting the key frame to the encoder.

According to one or more embodiments of the present disclosure, the video processing apparatus further comprises:

an allocation unit for allocating a decoder identifier to each decoder;

a determination sub-unit for determining a decoder for decoding each segment of multimedia material.

According to one or more embodiments of the present disclosure, the key frame is an instantaneous decoding refresh IDR frame.

According to one or more embodiments of the present disclosure, the encoding unit is used for, for each adjacent key frames, performing an encoding operation on a non-key frame between each adjacent key frames based on a preceding key frame to generate a video of the multimedia information.

According to one or more embodiments of the present disclosure, the encoding unit is used for generating the video of the multimedia information based on the encoding operations of the encoder according to the key frame and a preset video code rate, wherein the video code rate is determined based on preset video demand information.

In a third aspect, according to one or more embodiments of the present disclosure, there is provided an electronic device comprising: at least one processor and a memory;

the memory stores computer-executable instructions;

the at least one processor executes the computer-executable instructions stored in the memory to cause the at least one processor to perform the video processing method according to the above first aspect and various possibilities of the first aspect.

In a fourth aspect, according to one or more embodiments of the present disclosure, there is provided a computer-readable storage medium having stored therein computer-executable instructions which, when executed by a processor, implement the video processing method according to the above first aspect and various possibilities of the first aspect.

In a fifth aspect, according to one or more embodiments of the present disclosure, there is provided a computer program product comprising: a computer program, the computer program being stored in a readable storage medium, the computer program being readable by at least one processor of the electronic device from the readable storage medium, the at least one processor executing the computer program to cause the electronic device to perform the video processing method according to the above first aspect and various possibilities of the first aspect.

In a sixth aspect, according to one or more embodiments of the present disclosure, there is provided a video processing system, comprising: a plurality of decoders, a renderer connected with each decoder, and an encoder connected with the renderer, wherein the each decoder is used for decoding non-adjacent segments of multimedia material in multimedia information comprising multiple segments of multimedia material to obtain video frames, wherein one segment of multimedia material corresponds to at least one video frame;

the renderer is used for generating and outputting a key frame to the encoder in response to two adjacent video frames received by the renderer being decoded by different decoders;

the encoder is used for generating a video of the multimedia information according to encoding operations of the key frame.

According to one or more embodiments of the present disclosure, each decoder has a decoder identifier, and each video frame carries a decoder identifier of the each video frame obtained by decoding; the render is used to, if the decoder identifiers respectively carried by the two adjacent video frames are different decoder identifiers, determine that the two adjacent video frames are generated by different decoders by decoding, and generate a key frame based on the render and output the key frame to the encoder.

According to one or more embodiments of the present disclosure, the key frame is an instantaneous decoding refresh IDR frame.

According to one or more embodiments of the present disclosure, the encoder is used for, for each adjacent key frames, performing an encoding operation on a non-key frame between each adjacent key frames based on a preceding key frame to generate a video of the multimedia information.

According to one or more embodiments of the present disclosure, the encoder is used for generating the video of the multimedia information based on the encoding operations of the encoder according to the key frame and a preset video code rate, wherein the video code rate is determined based on preset video demand information.

In a seventh aspect, according to one or more embodiments of the present disclosure, there is provided a computer program which, when executed by a processor, performs the video processing method according to the above first aspect and various possibilities of the first aspect.

What are described above are only preferred embodiments of the present disclosure and illustrate the technical principles employed. It will be appreciated by those skilled in the art that the scope of the present disclosure is not limited to technical solutions formed by specific combinations of the above technical features, and meanwhile should also comprise other technical solutions formed by any combinations of the above technical features or equivalent features thereof, for example, technical solutions formed by replacement of the above technical features with technical features having similar functions disclosed by the present disclosure.

In addition, while operations are depicted in a particular order, this should not be understood as requiring that the operations be performed in the particular order shown or in a sequential order. In certain circumstances, multitasking and parallel processing may be advantageous. As such, while several specific implementation details have been included in the above discussion, these should not be construed as limiting the scope of the present disclosure. Certain features that are described in the context of separate embodiments may also be implemented in combination in a single embodiment. Conversely, various features that are described in the context of a single embodiment may also be implemented in multiple embodiments separately or in any suitable sub-combination.

Although the subject matter has been described in language specific to structural features and/or methodological acts, it is to be understood that the subject matter defined in the appended claims is not necessarily limited to the specific features or acts described above. Rather, the specific features and acts described above are merely exemplary forms of implementing the claims.

I claim:

1. A video processing method, comprising;

acquiring multimedia information, the multimedia information comprising multiple segments of multimedia material, and decoding the multiple segments of multimedia material based on different decoders to obtain video frames of the respective segments of multimedia material, wherein one decoder decodes non-adjacent segments of multimedia material, and one segment of multimedia material corresponds to at least one video frame;

in response to two adjacent video frames received by a renderer being decoded by different decoders, generating a key frame based on the renderer, outputting the key frame to an encoder, and generating a video of the multimedia information based on encoding operations of the encoder according to the key frame, wherein each decoder has a decoder identifier, and each video frame carries a decoder identifier of the each video frame obtained by decoding, and in response to two adjacent video frames received by a renderer being decoded by different decoders, generating a key frame based on the renderer, outputting the key frame to an encoder, comprises:

in response to the decoder identifiers respectively carried by the two adjacent video frames being different decoder identifiers, determining that the two adjacent video frames are decoded by different decoders, and generating the key frame based on the render and outputting the key frame to the encoder.

2. The method according to claim 1, further comprising:

allocating the decoder identifier to the each decoder, and determining a decoder for decoding each segment of multimedia material.

3. The method according to claim 1, wherein the key frame is an instantaneous decoding refresh IDR frame.

4. The method according to claim 1, wherein generating a video of the multimedia information based on encoding operations of the encoder according to the key frame comprises:

for each adjacent key frames, performing an encoding operation on a non-key frame between each adjacent key frames based on a preceding key frame to generate the video of the multimedia information.

5. The method according to claim 1, wherein generating a video of the multimedia information based on encoding operations of the encoder according to the key frame comprises:

generating the video of the multimedia information based on the encoding operations of the encoder according to the key frame and a preset video code rate, wherein the video code rate is determined based on preset video demand information.

6. An electronic device comprising: at least one processor and a memory;

the memory storing computer-executable instructions;

the at least one processor executing the computer-executable instructions stored in the memory to cause the at least one processor to perform operations comprising:

acquiring multimedia information, the multimedia information comprising multiple segments of multimedia material, and decoding the multiple segments of multimedia material based on different decoders to obtain video frames of the respective segments of multimedia material, wherein one decoder decodes non-adjacent segments of multimedia material, and one segment of multimedia material corresponds to at least one video frame;

in response to two adjacent video frames received by a renderer being decoded by different decoders, generating a key frame based on the renderer, outputting the key frame to an encoder, and generating a video of the multimedia information based on encoding operations of the encoder according to the key frame, wherein each decoder has a decoder identifier, and each video frame carries a decoder identifier of the each video frame obtained by decoding, and in response to two adjacent video frames received by a renderer being decoded by different decoders, generating a key frame based on the renderer, outputting the key frame to an encoder, comprises:

in response to the decoder identifiers respectively carried by the two adjacent video frames being different decoder identifiers, determining that the two adjacent video frames are decoded by different decoders, and generating the key frame based on the render and outputting the key frame to the encoder.

7. The electronic device according to claim 6, the operations further comprising:

allocating the decoder identifier to the each decoder, and determining a decoder for decoding each segment of multimedia material.

8. The electronic device according to claim 6, wherein the key frame is an instantaneous decoding refresh IDR frame.

9. The electronic device according to claim 6, wherein generating a video of the multimedia information based on encoding operations of the encoder according to the key frame comprises:

for each adjacent key frames, performing an encoding operation on a non-key frame between each adjacent key frames based on a preceding key frame to generate the video of the multimedia information.

10. The electronic device according to claim 6, wherein generating a video of the multimedia information based on encoding operations of the encoder according to the key frame comprises:

generating the video of the multimedia information based on the encoding operations of the encoder according to the key frames and a preset video code rate, wherein the video code rate is determined based on preset video demand information.

11. A video processing system, comprising: a plurality of decoders, a renderer connected with each decoder, and an encoder connected with the renderer, wherein

18 the each decoder is used for decoding non-adjacent segments of multimedia material in multimedia information comprising multiple segments of multimedia material to obtain video frames, wherein one segment of multimedia material corresponds to at least one video frame, the renderer is used for generating and outputting a key frame to the encoder in response to two adjacent video frames received by the renderer being decoded by different decoders, the encoder is used for generating a video of the multimedia information according to encoding operations of the key frame, each decoder has a decoder identifier, and each video frame carries a decoder identifier of the each video frame obtained by decoding, and the renderer is used for generating and outputting a key frame to the encoder in response to two adjacent video frames received by the renderer being decoded by different decoders, comprises:

in response to the decoder identifiers respectively carried by the two adjacent video frames being different decoder identifiers, determining that the two adjacent video frames are decoded by different decoders, and generating the key frame based on the render and outputting the key frame to the encoder.

12. The video processing system according to claim 11, further comprising:

the video processing system is used for allocating the decoder identifier to the each decoder, and determining a decoder for decoding each segment of multimedia material.

13. The video processing system according to claim 11, wherein the key frame is an instantaneous decoding refresh IDR frame.

14. The video processing system according to claim 11, wherein the encoder is used for generating a video of the multimedia information according to encoding operations of the key frame comprises:

for each adjacent key frames, performing an encoding operation on a non-key frame between each adjacent key frames based on a preceding key frame to generate the video of the multimedia information.

15. The video processing system according to claim 11, wherein the encoder is used for generating a video of the multimedia information according to encoding operations of the key frame comprises:

generating the video of the multimedia information based on the encoding operations of the encoder according to the key frame and a preset video code rate, wherein the video code rate is determined based on preset video demand information.

* * * * *